(12) United States Patent
Blümmel et al.

(10) Patent No.: US 9,163,557 B2
(45) Date of Patent: Oct. 20, 2015

(54) TURBOCHARGER

(75) Inventors: Dirk Blümmel, Schwieberdingen (DE);
Claus Fleig, Asperg (DE); Matthias Stein, Korntal-Münchingen (DE);
Andreas Wengert, Auenwald (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 1237 days.

(21) Appl. No.: 12/863,607

(22) PCT Filed: Jan. 9, 2009

(86) PCT No.: PCT/EP2009/050211
§ 371 (c)(1),
(2), (4) Date: Oct. 5, 2010

(87) PCT Pub. No.: WO2009/092636
PCT Pub. Date: Jul. 30, 2009

(65) Prior Publication Data
US 2011/0014034 A1 Jan. 20, 2011

(30) Foreign Application Priority Data
Jan. 21, 2008 (DE) .......................... 10 2008 005 404

(51) Int. Cl.
*F01D 17/16* (2006.01)
*F02B 37/22* (2006.01)

(52) U.S. Cl.
CPC ............ *F02B 37/225* (2013.01); *F01D 17/165* (2013.01); *F05D 2220/40* (2013.01); *Y02T 10/144* (2013.01)

(58) Field of Classification Search
CPC ....... F01D 9/026; F01D 9/048; F01D 17/165; F01D 17/167; F05D 2220/40; F05D 2260/30
USPC ............... 415/146, 147, 148, 164, 165, 174.2
See application file for complete search history.

(56) References Cited

U.S. PATENT DOCUMENTS

| 4,324,526 A | * | 4/1982 | Berchtold et al. | 415/48 |
| 4,499,731 A | * | 2/1985 | Moser | 60/602 |
| 4,643,640 A | * | 2/1987 | Burdette et al. | 415/164 |

(Continued)

FOREIGN PATENT DOCUMENTS

| DE | 102004038748 A1 | 2/2006 |
| DE | 102006018055 A1 | 10/2007 |

(Continued)

OTHER PUBLICATIONS

English abstract provided for EP-1503042.

*Primary Examiner* — Sean J Younger
(74) *Attorney, Agent, or Firm* — Fishman Stewart Yamaguchi PLLC

(57) ABSTRACT

A turbocharger, comprising: at least one of a turbine housing, a bearing housing and a turbine wheel, wherein the turbine wheel is rotatably mounted about an axis and includes a guide apparatus with a plurality of guide vanes rotatably mounted in pivot bearings on a guide vane support, wherein the guide vanes influence the flow in a flow channel of the turbine housing; and a spring element, which moveably loads the guide apparatus in an axial direction against a wall of the turbine housing, and wherein the disc springs seal a displacement chamber provided with a displacement mechanism of the guide apparatus against the flow channel.

20 Claims, 1 Drawing Sheet

(56) References Cited

U.S. PATENT DOCUMENTS

| | | | |
|---|---|---|---|
| 4,654,941 A * | 4/1987 | Burdette et al. | 29/889.22 |
| 4,659,295 A * | 4/1987 | Burdette et al. | 417/407 |
| 4,804,316 A * | 2/1989 | Fleury | 417/407 |
| 5,087,176 A * | 2/1992 | Wieland | 417/407 |
| 5,207,565 A * | 5/1993 | Roessler | 417/407 |
| 6,145,313 A | 11/2000 | Arnold | |
| 6,168,375 B1 * | 1/2001 | LaRue et al. | 415/146 |
| 6,916,153 B2 * | 7/2005 | Boening | 415/163 |
| 7,001,142 B2 * | 2/2006 | Knauer et al. | 415/160 |
| 7,189,058 B2 * | 3/2007 | Metz et al. | 415/165 |
| 7,322,791 B2 * | 1/2008 | Stilgenbauer | 415/164 |
| 7,600,379 B2 * | 10/2009 | Fledersbacher et al. | 60/602 |
| 8,322,979 B2 * | 12/2012 | Walter et al. | 415/177 |
| 2006/0034684 A1 | 2/2006 | Metz et al. | |
| 2006/0062663 A1 * | 3/2006 | Figura et al. | 415/160 |
| 2007/0175216 A1 * | 8/2007 | Kobayashi | 60/605.2 |
| 2007/0180825 A1 | 8/2007 | Fledersbacher et al. | |
| 2009/0094979 A1 | 4/2009 | Eissler et al. | |

FOREIGN PATENT DOCUMENTS

| | | |
|---|---|---|
| EP | 0160460 A2 | 11/1985 |
| EP | 1503042 A1 | 2/2005 |
| EP | 1536103 A1 | 6/2005 |
| EP | 1785613 A2 | 5/2007 |
| WO | WO-2007/107289 A1 | 9/2007 |

* cited by examiner

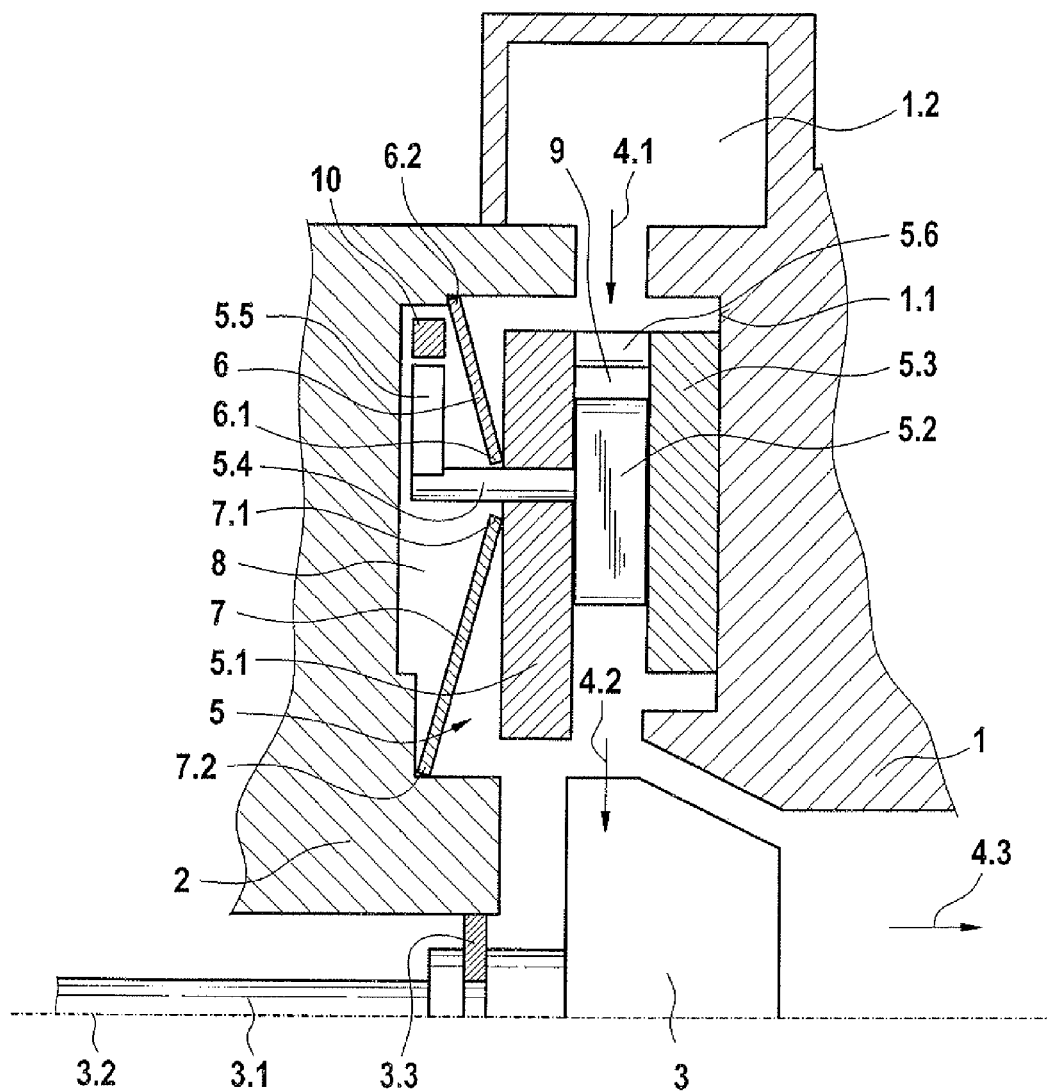

TURBOCHARGER

CROSS-REFERENCES TO RELATED APPLICATIONS

This application claims priority to German application DE 10 2008 005 404.6 filed on Jan. 21, 2008, and PCT EP/2009/050211 filed on Jan. 9, 2009, both of which are hereby incorporated by reference in their entirety.

PRIOR ART

The invention relates to a turbocharger with the features of the preamble of Claim 1.

Such a turbocharger is known for example from EP 0160 460 B1. Such turbochargers for combustion engines of motor vehicles consist of a compressor and a turbine mounted on a common shaft. Because of the large rotational speed range of passenger car engines, controlling of the turbocharger is required, which is achieved by way of a variable turbine geometry. A guide vane insert designated guide apparatus in the following with a plurality of pivotable guide vanes arranged on a guide vane support which can be pivoted by means of a common displacement mechanism in order to influence the backing-up characteristics in a flow channel of the turbine housing serves for this purpose. Each of the guide vanes is rotatably arranged in the guide vane support via a shaft in pivot bearings. From EP 0160 460 B1 it is known to preload the guide vane support by means of a spring element in such a manner that the guide apparatus with the guide vanes is pressed against an inner wall of the turbine housing.

Furthermore, turbochargers are known from the prior art which, between a bearing housing accommodating the shaft of the turbine wheel and the turbine housing, comprise a heat shield which protects the bearing housing from the hot gas of the turbine part. Such a turbocharger is known for example from EP 1 785 613 A2.

EP 1 503 042 A1 shows a turbocharger with guide apparatus and heat shield between the bearing housing and the guide apparatus. However, the heat shield is bent over in an elaborate manner and does not support itself on the guide apparatus so that hot gas can flow behind the heat shield via the open gap between the guide apparatus and the bearing housing. In addition, with the design shown there, the guide apparatus is connected to the turbine housing in a fixed manner resulting in disadvantages with respect to thermal expansion of the components of the guide apparatus, which can bring about jamming of the variable turbine geometry.

DISCLOSURE OF THE INVENTION

Advantages of the Invention

The turbocharger according to the invention with the characterizing features of Claim 1 of the application advantageously utilises a guide apparatus which in axial direction is moveable and spring-loaded in combination with two disc springs which both support themselves on the guide apparatus and with respect to the rotational axis of the turbine wheel are arranged above and below the guide vane pivot bearing. Disc springs in the context of the application means springs having a circumferentially closed and areal profile and which for example have a C-shaped, V-shaped, U-shaped, O-shaped, S-shaped, Z-shaped or other cross-sectional profile. Through the above-mentioned measures it is advantageously achieved that the displacement chamber of the turbocharger accommodating the displacement mechanism is sealed against the flow channel of the turbine housing subjected to hot gas through-flow, as a result of which it is prevented that the displacement mechanism is deformed in radial direction at high temperatures and the wear of the displacement mechanism dependent on the temperature can be significantly reduced as well.

Advantageous designs and further developments of the invention are made possible through the measures stated in the dependent claims.

It is particularly advantageous if at least one of the disc springs forms a heat shield. The heat shield brings about even heating of the guide vane support since the guide vane support is not cooled on one side so that it expands evenly. Because of this, the spacing between the guide vanes and the guide vane support remains almost constant so that the gap between the guide vanes and the guide vane support and the cover disc of the guide apparatus can be reduced and thus the thermodynamic efficiency of the turbocharger is improved.

Particularly preferably a first disc spring serves as heat shield wherein, although this first disc spring contacts the guide apparatus with a low spring action, the spring force required for the axial orientation of the guide apparatus however is substantially exerted by the second disc spring.

This second disc spring is preferentially produced of a temperature-resistant spring material which exerts the necessary clamping force even at high temperatures such as occur in the flow channel of the turbine housing in order to subject the guide apparatus to a spring force of sufficient magnitude to axially secure said guide apparatus.

In another exemplary embodiment both disc springs are designed as heat shield. The two heat shields bring about that on the one hand the bearing disc is heated and deformed particularly evenly. The displacement chamber of the displacement mechanism of the guide apparatus is particularly well protected against heat.

A particularly simple mechanical construction is made possible in that the first disc spring and the second disc spring each support themselves on a bearing housing of the turbocharger with their ends facing away from the pivot bearings of the guide vanes and with their ends facing the pivot bearings of the guide vanes support themselves on the guide vane support in the vicinity of the guide vane bearings.

BRIEF DESCRIPTION OF THE DRAWINGS

Exemplary embodiments of the invention are shown in the drawings and are explained in more detail in the following description. It shows:

FIG. 1 a schematic detail of a cross-sectional view of a turbocharger with a spring-loaded guide apparatus between the bearing housing and the turbine housing.

EMBODIMENTS OF THE INVENTION

FIG. 1 shows in greatly simplified form a detail of a cross-sectional view of a turbocharger. The turbocharger comprises a compressor part which is not shown here with a compressor wheel which is connected to a turbine wheel 3 mounted in a turbine housing 1 via a shaft 3.1. The shaft 3.1 in a manner not shown here is rotatably mounted about an axis 3.2 in a bearing housing 2 of the turbocharger and sealed against the bearing housing via a seal 3.3. The axis 3.2 of the turbine wheel 3 constitutes an axial direction. Perpendicularly to the axis 3.2 a radial direction is defined.

In operation, hot exhaust gas of a combustion engine flows through a helical channel 1.2 of the turbine housing in direction 4.1 into a flow channel 9 provided with displaceable guide vanes 5.2 and from there in direction 4.2 to the turbine wheel and finally in direction 4.3 to an outlet of the turbine housing 1.

Between the bearing housing 2 and the turbine housing 1 a guide apparatus 5 accommodating the guide vanes 5.2 is arranged. The guide apparatus comprises a ring disc shaped guide vane support 5.1 which is provided with a plurality of bores arranged parallel to the rotational axis 3.2 of the turbine wheel in each of which bores shafts of the guide vanes 5.2 engage subject to the formation of a pivot bearing 5.4. The pivot bearing 5.4 are distributed over the circumference of the guide vane support and with respect to the rotational axis 3.2 of the turbine wheel preferentially arranged at equal radial spacing. The shafts of the guide vanes are provided for example with a pivot arm 5.5 which interacts with a displacement mechanism 10. By way of the displacement mechanism 10 the guide vanes 5.2 can be synchronously pivoted. The guide apparatus 5 can additionally comprise a cover disc 5.3 which via spacers 5.6 is held spaced from the guide vane support 5.1. Between the cover disc 5.3 and guide vane support 5.1 the guide vanes 5.2 are arranged, wherein the guide vanes are spaced from the guide vane support and the cover disc through a small gap which is not shown. The guide vane support 5.1, the spacers 5.6 and the cover disc 5.3 can contact one another loosely or be partially connected in a fixed manner or connected in their entirety in a fixed manner.

According to the invention, the guide apparatus 5 is loaded by two disc springs 6 and 7. The disc springs 6 and 7 each support themselves on the bearing housing 2 of the turbocharger with their ends 6.2 and 7.2 facing away in radial direction from the pivot bearings 5.4 of the guide vanes. The ends 6.1 and 7.1 of the disc springs in radial direction facing the pivot bearings 5.4 of the guide vanes support themselves in the vicinity of the pivot bearings 5.4 on the guide vane support 5.1, as a result of which the guide apparatus 5 with the cover disc 5.3 is pressed against a wall 1.1 of the turbine housing 1 in axial direction via spacing elements.

A first disc spring 7 is arranged in radial direction between the rotational axis 3.2 of the turbine wheel 3 and the pivot bearings 5.4 of the guide vanes 5. The first disc spring 7 in the preferred exemplary embodiment shown here takes over the function of a heat shield and is produced of material of low heat conductivity. The first disc spring 7 merely needs to push against the guide apparatus with the low clamping force necessary to achieve the sealing effect since axial securing is substantially taken over by the second disc spring. The second disc spring 6 is arranged in radial direction on the side of the pivot bearings 5.4 facing away from the rotational axis 3.2 of the turbine wheel. The second disc spring 6 in a preferred exemplary embodiment is produced of a temperature-resistant spring material which even at high temperatures such as occur in the flow channel 9 of the turbine housing 1 exerts the necessary clamping force to load the guide apparatus 5 with a spring force of adequate magnitude to axially secure said guide apparatus.

It is evident in FIG. 1 that by the two disc springs 6 and 7 contacting the guide vane support it is achieved that the displacement chamber 8 provided with the displacement mechanism 10 of the guide apparatus is sealed against the flow channel 9 through which the hot gas flows. Consequently hot gas cannot enter the displacement chamber from the flow channel 9 as a result of which the displacement mechanism is particularly well protected.

Other than shown here, the second disc spring 6 can obviously be designed as heat shield and axial securing taken over by the first disc spring 7.

In a further exemplary embodiment it is provided that both disc springs 6 and 7 each form a heat shield as a result of which the displacement chamber is particularly well protected against heat input since the flow channel 9 is then separated from the displacement chamber through the heat shields over almost its entire radial extension. In this case it can be provided that both disc springs 6 and 7 take over the axial securing of the guide apparatus 5 and are suitably designed with respect to their spring forces.

The invention claimed is:

1. A turbocharger, comprising: at least one of a turbine housing, a bearing housing and a turbine wheel, wherein the turbine wheel is rotatably mounted about an axis and includes a guide apparatus with a plurality of guide vanes rotatably mounted in pivot bearings on a guide vane support, wherein the guide vanes influence the flow in a flow channel of the turbine housing; and a spring element, which moveably loads the guide apparatus in an axial direction against a wall of the turbine housing, wherein two disc springs are between the guide apparatus and the bearing housing and are arranged such that a proximate end of each disc spring is in direct contact with the guide apparatus and a distal end of each disc spring is in direct contact with the bearing housing, wherein a first disc spring is arranged in a radial direction between the rotational axis of the turbine wheel and the pivot bearings of the guide vanes and a second disc spring is arranged in a radial direction on the side of the pivot bearings facing away from the rotational axis of the turbine wheel, wherein each disc spring includes a single member extending linearly between the proximate end and the distal end, and is oriented at an angle with respect to the rotational axis of the turbine such that the proximate end of each disc spring is axially closer to the guide vanes than the distal end of each disc spring such that the guide apparatus is pressed against the wall of the turbine housing, and wherein the disc springs seal a displacement chamber provided with a displacement mechanism of the guide apparatus against the flow channel.

2. The turbocharger according to claim 1, wherein at least one of the disc springs forms a heat shield.

3. The turbocharger according to claim 1, wherein the first disc spring and the second disc spring each form a heat shield.

4. The turbocharger according to claim 1, wherein at least one of the disc springs consists of a temperature-resistant spring material, wherein the spring resists high temperatures that occur in the flow channel of the turbine housing, and wherein the disc springs exert a spring force sufficient to axially secure and load the guide apparatus with a predetermined clamping force.

5. The turbocharger according to claim 1, wherein the first disc spring and the second disc spring each support themselves on the bearing housing with at least one end facing away from the pivot bearings of the guide vanes.

6. The turbocharger according to claim 1, wherein the first disc spring and the second disc spring each support themselves on the guide vane support with at least one end facing the pivot bearings of the guide vanes.

7. The turbocharger according to claim 2, wherein at least one of the disc springs consists of a temperature-resistant spring material, wherein the spring resists high temperatures that occur in the flow channel of the turbine housing, and wherein the disc springs exert a spring force sufficient to axially secure and load the guide apparatus with a predetermined clamping force.

8. The turbocharger according to claim 2, wherein the first disc spring and the second disc spring each support themselves on the bearing housing with at least one end facing away from the pivot bearings of the guide vanes.

9. The turbocharger according to claim 4, wherein the first disc spring and the second disc spring each support themselves on the bearing housing with at least one end facing away from the pivot bearings of the guide vanes.

10. The turbocharger according to claim 2, wherein the first disc spring and the second disc spring each support themselves on the guide vane support with at least one end facing the pivot bearings of the guide vanes.

11. The turbocharger according to claim 4, wherein the first disc spring and the second disc spring each support themselves on the guide vane support with at least one end facing the pivot bearings of the guide vanes.

12. A turbocharger, comprising:
    a turbine housing;
    a bearing housing;
    a turbine wheel rotatably mounted about an axis, wherein the turbine wheel includes a guide apparatus having a plurality of guide vanes that are rotatably mounted in at least one pivot bearing on a guide vane support, and wherein the guide vanes influence the flow in the turbine housing; and
    a spring element, which moveably loads the guide apparatus in an axial direction against a wall of the turbine housing, wherein two disc springs are between the guide apparatus and the bearing housing and are arranged such that a proximate end of each disc spring is in direct contact with the guide apparatus and a distal end of each disc spring is in direct contact with the bearing housing, wherein a first disc spring is arranged in a radial direction between the rotational axis of the turbine wheel and the pivot bearings of the guide vanes and a second disc spring is arranged in a radial direction on the side of the pivot bearings facing away from the rotational axis of the turbine wheel, wherein each disc spring is oriented at an angle with respect to the rotational axis of the turbine with the proximate end of each disc spring being axially closer to the guide vanes and radially closer to the pivot bearings than the distal end of each disc spring such that the guide apparatus is pressed against the wall of the turbine housing, and wherein the disc springs seal a displacement chamber provided with a displacement mechanism of the guide apparatus against the flow channel;
    wherein the first disc spring and the second disc spring each supports itself on the bearing housing with the distal end facing away in a radial direction from the at least one pivot bearing of the guide vanes, and supports itself on the guide vane support with the proximate end facing the at least one pivot bearing of the guide vanes in the vicinity of the at least one pivot bearing.

13. The turbocharger according to claim 12, wherein at least one of the disc springs forms a heat shield.

14. The turbocharger according to claim 12, wherein at least one of the disc springs consists of a temperature-resistant spring material, wherein the spring resists high temperatures that occur in the flow channel of the turbine housing, and wherein the disc springs exert a spring force sufficient to axially secure and load the guide apparatus with a predetermined clamping force.

15. The turbocharger according to claim 12, wherein the first disc spring and the second disc spring each support themselves on the guide vane support with at least one end facing the pivot bearings of the guide vanes.

16. The turbocharger according to claim 1, wherein the guide apparatus further comprises a cover disc spaced apart from the guide vane support via at least one spacer, the plurality of guide vanes being positioned between the guide vane support and the cover disc, and the guide vanes are spaced from the guide vane support and the cover disc.

17. A turbocharger comprising:
    a turbine housing;
    a bearing housing;
    a turbine wheel rotatably mounted about an axis, the turbine wheel including a guide apparatus having a plurality of guide vanes that are rotatably mounted in at least one pivot bearing on a guide vane support, the guide vanes being configured to influence flow in the turbine housing, and a cover disc spaced apart from the guide vane support such that the plurality of guide vanes are positioned between the guide vane support and the cover disc, and the guide vanes are spaced from the guide vane support and the cover disc;
    a first disc spring arranged in a radial direction between the rotational axis of the turbine wheel and the at least one pivot bearing of the guide vanes, the first disc spring supporting itself on the guide apparatus and the bearing housing; and
    a second disc spring arranged in a radial direction on the side of the at least one pivot bearing facing away from the rotational axis of the turbine wheel, the second disc spring supporting itself on the guide apparatus and the bearing housing;
    wherein the first disc spring and the second disc spring each includes a single member extending linearly between the proximate end and the distal end, and are each oriented at an angle with respect to the rotational axis with a proximate end of each disc spring being axially closer to the guide vanes than a distal end of each disc spring such that the disc springs moveably load the guide apparatus in an axial direction against a wall of the turbine housing;
    wherein the first disc spring and the second disc spring each is in direct contact with the guide apparatus and the bearing housing and each supports itself on the bearing housing with the distal end facing away in a radial direction from the at least one pivot bearing of the guide vanes, and supports itself on the guide vane support with the proximate end facing the at least one pivot bearing of the guide vanes in the vicinity of the at least one pivot bearing.

18. The turbocharger according to claim 17, wherein at least one of the disc springs consists of a temperature-resistant spring material, wherein the spring resists high temperatures that occur in the flow channel of the turbine housing, and wherein the disc springs exert a spring force sufficient to axially secure and load the guide apparatus with a predetermined clamping force.

19. The turbocharger according to claim 1, wherein the proximate ends of the first disc spring and the second disc spring are radially closer to the pivot bearings than the distal ends of the first disc spring and the second disc spring.

20. The turbocharger according to claim 1, wherein the distal ends of the first disc spring and the second disc spring are pressed against respective corner edges formed in the bearing housing.

* * * * *